United States Patent [19]

Wasserman

[11] 4,445,869
[45] May 1, 1984

[54] TEACHING METHOD AND APPARATUS

[76] Inventor: Myrna D. Wasserman, 6 Ronald Ter., Springfield, N.J. 07081

[21] Appl. No.: 319,470

[22] Filed: Nov. 9, 1981

[51] Int. Cl.³ .......................... G09B 1/00; G09B 19/00
[52] U.S. Cl. ....................................................... 434/156
[58] Field of Search .............. 434/156, 162, 170, 172, 434/178, 157, 167, 324, 238

[56] References Cited

U.S. PATENT DOCUMENTS

| | | | |
|---|---|---|---|
| 1,198,401 | 9/1916 | Blanchard | 434/156 |
| 1,603,129 | 10/1926 | McDade | 434/178 |
| 1,812,077 | 6/1950 | Cougias | |
| 3,289,319 | 12/1966 | Kiehl | 434/324 |
| 3,290,796 | 12/1966 | Gurda | 434/238 |
| 3,724,102 | 4/1973 | Van Patten | 434/157 |
| 3,823,492 | 7/1974 | Allain | 434/170 |
| 3,885,326 | 5/1975 | Robinson | 434/170 |
| 4,021,937 | 5/1977 | Kravitz | 434/167 |

OTHER PUBLICATIONS

Teaching Resources 1979 Catalog, cover page and pp. 14-15.
Developmental Learning Materials 1976 Catalog, title page and p. 116.

Primary Examiner—William H. Grieb
Attorney, Agent, or Firm—Lerner, David, Littenberg, Krumholz & Mentlik

[57] ABSTRACT

The teaching method and apparatus of the present invention provides an organizational plan for writing and creates a comfortable mode of expression for all individuals by allowing such individuals to consciously examine the composition process and develop a set of writing experiences which is designed to improve their ability to write. The teaching method and apparatus begins with several different color-coded index cards. The cards have the key words WHO, WHAT, WHERE, WHY and HOW printed at the top. The individual picks a topic and chooses the first card with the word WHO on it. The individual then decides who the characters are going to be in his story and writes them on the card. The next step is to decide what is going to happen to the characters, with the third step deciding where the characters are going to live. The fourth step when the story occurs and how, i.e., resolution of the story. Upon completion of the cards, the individual takes each recorded concept, makes it into a completed sentence and sews them together using thread to form an outline in the form of a mobile. The idea of sewing thoughts together puts the individuals mind in logical order allowing them to rearrange, revise and rethink the order of the cards after the outline is formed. The completed story is the final step.

16 Claims, 3 Drawing Figures

TEACHING METHOD AND APPARATUS

BACKGROUND OF THE INVENTION

The present invention relates in general to a teaching method and apparatus adapted for developing the ability of individuals to express themselves creatively in their writing without procrastination and, more particularly, to a teaching method and apparatus adapted for stimulating in such individuals the creation of thoughts or concepts to be recorded for developing an outline therefrom to be used in the preparation of a writing on a selected topic.

As used herein, the term "writing" broadly refers to a composition, essay, article, poem, thesis, novel, short story, manuscript, or other such written material. As such, a writing is often considered to be a record of our language and plays a constant, vital role in our daily lives. Most individuals take the act of writing for granted as most individuals write each day, often, in the form of a simple list, note, or reminder to do something. Sometimes, however, the act of writing is more difficult where, for example, a composition, essay, or thesis is required. Regardless of the nature of the written material, one generally is unconscious of the process or act of writing and rarely considers how the skills were learned or the ease or difficulty with which such skills were mastered.

Such individuals, for example, elementary school children or students, are generally required to demonstrate two forms of skills in writing, i.e., creative writing and practical writing. Creative writing is usually described as stories and poems that flow from ideas and inspirations uniquely one's own, and in which the individual is motivated by an outside source such as a teacher to express one's feelings, thoughts, and emotions about a particular subject. In contrast, the term practical writing is often used to suggest more formal writing, done with a reader in mind, in which certain mechanical amentities are observed. Letters and reports are among the kinds of expository writing included in this category. It is obvious, of course, that practical writing needs creativity to bring it to life.

It can be appreciated that the act of writing has been a problem for most individuals in our society, whatever their education, educational level, or profession. In this regard, it is noted that the act of writing requires the ability to keep one idea in mind, to formulate the idea into words and appropriate syntax patterns, to plan the correct graphic form of each letter and word, to correctly manipulate the writing instrument to produce the letter shapes, to integrate complex eye-hand relationships, and to have sufficient visual and motor memory. As a consequence, such individuals often refrain from writing by becoming tense merely on hearing a writing assignment or who, in fact, withdraw from the educative process. The biggest obstacles to the act of writing, even when such individuals are motivated to write, are considered to be a fear of writing, weakness in writing skills, and in elementary school children a lack of background of experience for formulating ideas and feelings about themselves and the way they react to the world around them.

Accordingly, it can be appreciated that there is an unsolved need for a teaching method and apparatus which alleviates these noted obstacles and allows these individuals, such as elementary school children to express themselves creatively in their writing without procrastination.

SUMMARY OF THE INVENTION

It is broadly an object of the present invention to provide a teaching method and apparatus which fulfills one or more of the foregoing requirements for such a teaching method and apparatus and which avoids or overcomes one or more of the foregoing obstacles to the process of writing by an elementary school child or student. Specifically, it is within the contemplation of the present invention to provide a teaching method and apparatus which is adapted for developing an outline for the preparation of a writing therefrom on a selected topic, which method and apparatus instills in such child or student the habit of writing without procrastination.

A further object of the present invention is to provide a teaching method and apparatus which develops in an individual the ability to express themselves creatively in their writing.

A still further object of the present invention is to provide a teaching method and apparatus which allows for the development of good methodology and good organization for the formation of a well prepared writing.

A still further object of the present invention is to provide a teaching method and apparatus which provides the means for releasing in an individual their creative potential for expressing themselves through writing, and for gaining access at a conscious level to their inventive and intuitive imaginative powers.

A still further object of the present invention is to provide a teaching method and apparatus to develop the ability of elementary school children or students to produce various types of written material understandable to a designated group of readers and exhibiting characteristics of coherence, and reasonable control of syntactical options, usage options, and the mechanics of written English.

In accordance with one embodiment of the present invention, there is provided a teaching apparatus adapted for developing an outline for the preparation for a writing therefrom on a selected topic. The teaching apparatus is constructed to include means for stimulating in an individual the creation of a plurality of thoughts related to the topic, means for recording the created thoughts, and means for arranging the recorded thoughts into an outline for the development of a writing therefrom.

Further in accordance with the above embodiment, there is provided a teaching method and apparatus wherein the stimulating means comprise a plurality of cards having a key word thereon selected from the words comprising WHERE, WHO, WHY, WHEN, WHAT, and HOW.

Still further in accordance with the above embodiment, there is provided a teaching method and apparatus wherein each of the cards having a different key word thereon is a different color, and wherein the arranging means include a needle and string for removably sewing the cards together into an outline for the development of a writing therefrom.

Further in accordance with the present invention, there is provided a teaching method adapted for developing an outline for the preparation of a writing therefrom on a selected topic. The teaching method comprises the steps of providing a plurality of key words adapted for stimulating in an individual the creation of a plurality of thoughts related to the key word and the selected topic, recording the plurality of created thoughts, and arranging the plurality of recorded thoughts into an outline for the preparation of a writing therefrom on the selected topic.

Further in accordance with the last-mentioned embodiment, the arranging includes removably sewing the recorded thoughts together into an outline using a needle and string.

BRIEF DESCRIPTION OF THE DRAWINGS

The above description, as well as further objects, features, and advantages of the present invention, will be more fully understood by reference to the following detailed description of a presently preferred, but nonetheless illustrative, teaching method and apparatus in accordance with the present invention when taken in conjunction with the accompanying drawings, wherein.

DETAILED DESCRIPTION

Figure 1:
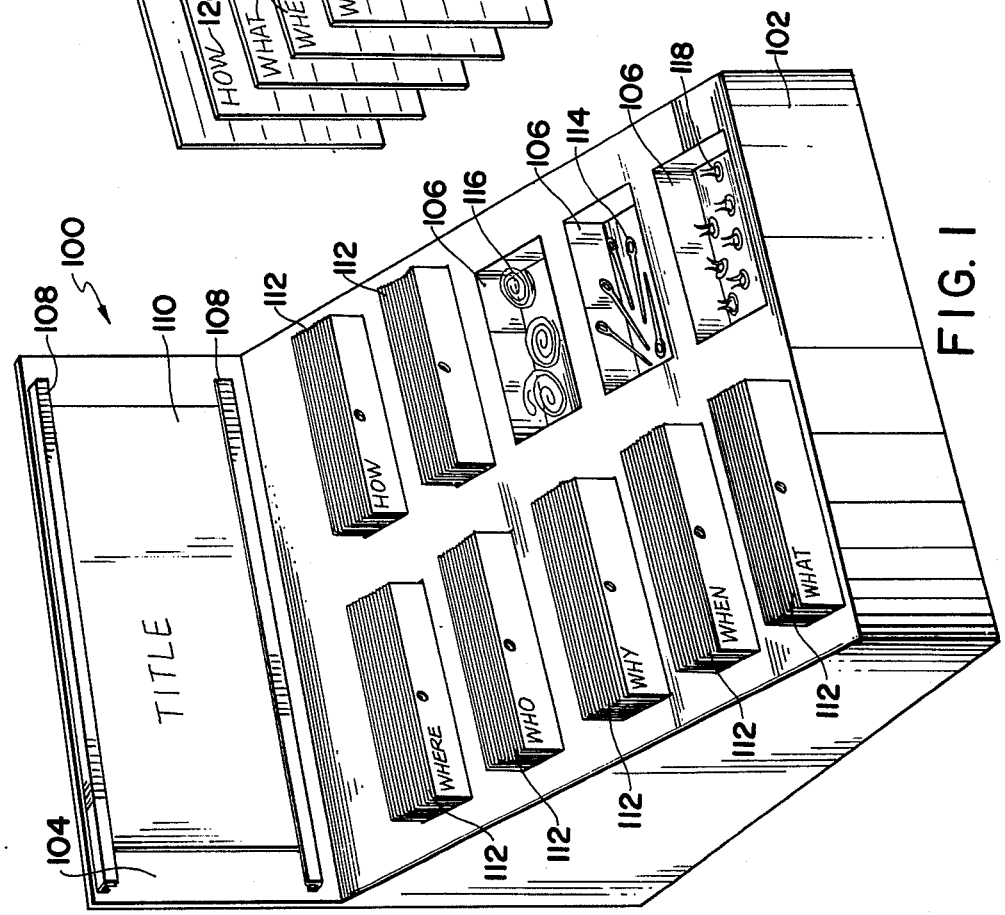
FIG. 1 is a perspective view of a teaching apparatus in accordance with the present invention including a plurality of cards having a key word thereon and means for removably and permanently arranging the cards together into an outline form.

Referring now to the drawings, in which like reference characters represent like elements, there is shown in FIG. 1 a teaching apparatus designated generally by reference character 100. The teaching apparatus 100 is generally constructed to include a storage box 102 having a headboard 104 and a plurality of recessed containers 106. The headboard 104 is constructed to include a pair of parallel spaced longitudinally extending guides 108 adapted to removably hold a title card 110 thereon. The recessed containers 106 are adapted to store for easy access and removal a plurality of cards 112, a plurality of needles 114, a plurality of thread or string segments 116, and a plurality of fasteners 118. Although the teaching apparatus 100 has been described to include a storage box 102 for storage of the cards 112, needles 114, thread or string segments 116, and fasteners 118, it is readily apparent that such teaching apparatus may be provided in the absence of such a storage box or a storage box of a different construction then that illustrated in FIG. 1. In this regard, it is contemplated that the teaching apparatus 100 may be provided in the form of a kit as illustrated in FIG. 1 having a storage box 102 or may be simply provided within a relatively large envelope (not shown) if desired.

Figure 2:
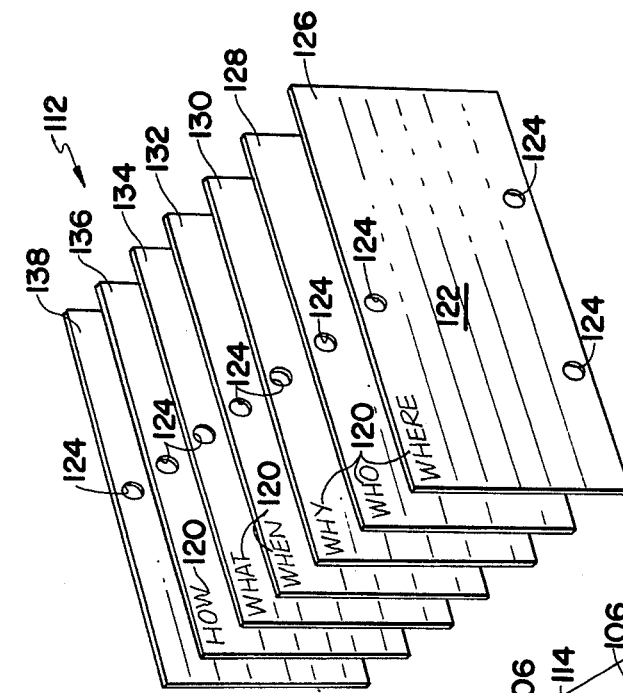
FIG. 2 is a perspective view of a plurality of cards having a different key word thereon and having a portion thereof adapted for recording created thoughts thereon.

Referring to FIG. 2, there is shown a plurality of cards 112 which are used in accordance with the teaching method and apparatus of the present invention. Specifically, the cards 112 are constructed to include a key word 120 provided at a corner thereof, a surface 122 adapted for recording those thoughts or concepts created by the stimulation of the key words, and a plurality of holes 124 adapted for securing the cards 112 together.

As illustrated in FIG. 2, the key words 120 are selected from the group comprising the words WHERE, WHO, WHY, WHEN, WHAT, and HOW. In this regard, the cards 112 will be referred to as the WHERE card 126, WHO card 128, WHY card 130, WHEN card 132, WHAT card 134, and HOW card 136. In addition, a blank card 138 may be provided. Although the key words have been selected from the words WHERE, WHO, WHY, WHEN, WHAT, and HOW, other key words which are adapted for stimulating in an individual the creation of a plurality of thoughts or concepts related to the topic of the writing may be utilized in accordance with the teaching method and apparatus of the present invention. Thus, it is apparent that the present invention is not limited to those key words illustrated and described herein. Further, each of the cards 112 may be color-coded, i.e., each card having a different key word 120 thereon may be of a different color. In this regard, and in accordance with one embodiment of the present invention, the WHERE card 126 can be blue, the WHO card 128 can be red, the WHY card 130 can be white, the WHEN card 132 can be green, the WHAT card 134 can be yellow, and the HOW card 136 can be orange. Although, of course, it is apparent that other colors may be used without departing from the present invention.

Figure 3:
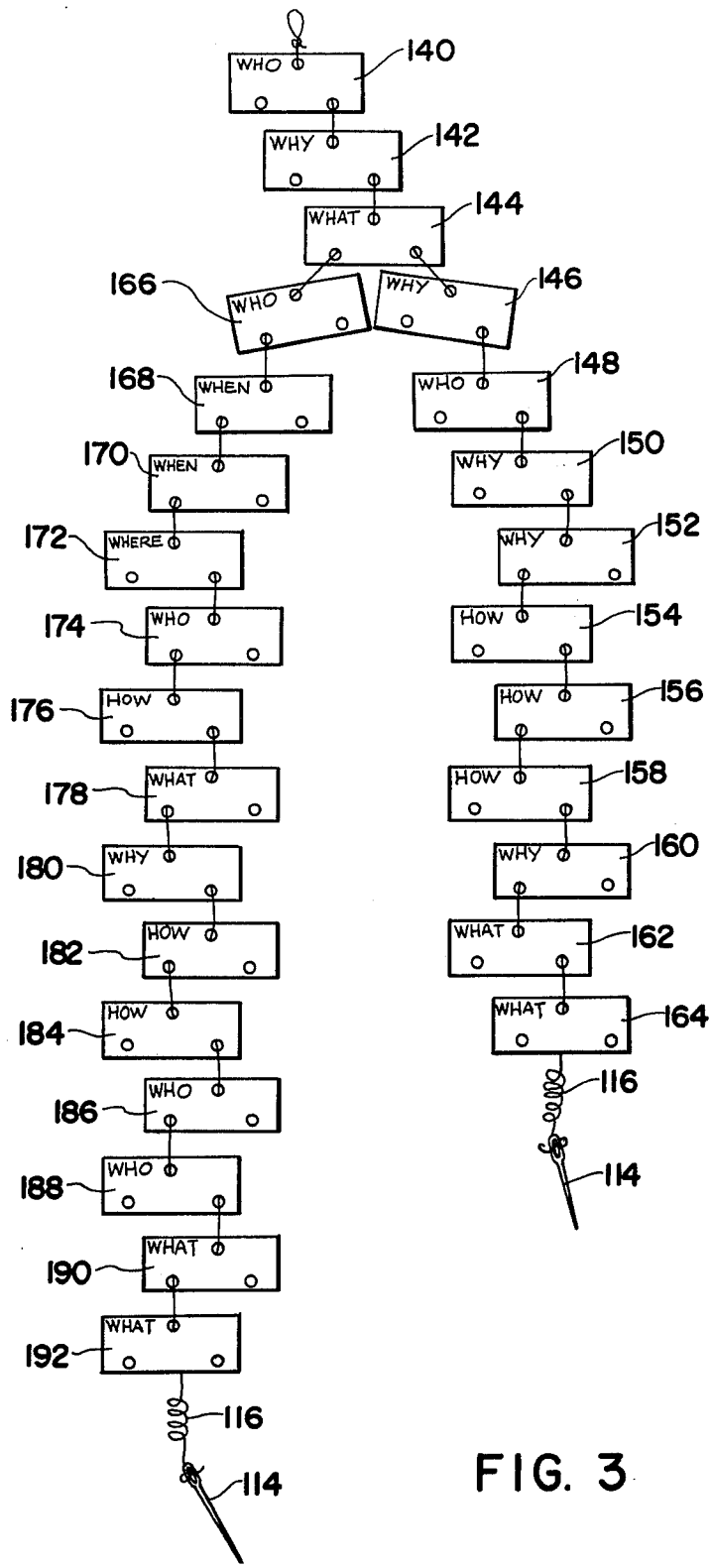
FIG. 3 is a front elevation of a plurality of cards arranged into an outline in accordance with one example of the present invention for the development of a writing therefrom.

The teaching method of the present invention will now be described generally with reference to the example as illustrated in FIG. 3. Initially, the title or topic of the writing, such as a story, is recorded on a blank title card 110 and secured to the headboard 104 between the guides 108. A red WHO card 128 is removed from the storage box 102 and the names of each character involved in the story are recorded on the surface 122. One WHO card 128 is used for each character in the story. After all the characters of the story have been identified, the blue WHERE cards 126, yellow WHAT cards 134, white WHY cards 130, green WHEN cards 132, and orange HOW cards 136 are completed in this order. In this regard, the WHERE cards 126 are used to tell where something takes place, the WHAT cards 134 are used to tell what happened or is happening, the WHY cards 130 are used to answer the why questions regarding the story, the WHEN cards 132 are used to tell when something happened or is going to happen, and the HOW cards 136 are used for generating the response to how questions regarding resolution of a situation. Each of the described cards 112 will stimulate in the elementary school child or student the creation of a thought or concept related to the key word 120 and the selected topic of the story. Such stimulation is aided by the fact that the cards 112 are of different colors to assist in the creative stimulation of one's mind. It is expected that the created thoughts will be recorded as a single word or short phrase. In this regard, it is the object of the cards 112 having a key word 120 thereon and color coded to motivated the elementary school child or student to write quickly, creatively, and comfortably.

Upon completion of the WHO cards 128, WHERE cards 126, WHAT cards 134, WHY cards 130, WHEN cards 132, and HOW cards 136, the WHO cards are arranged in front of the individual, separate and apart from the remaining cards 112. Using additional red WHO cards 128, one or more complete sentences are recorded on the surface 122 of each card. In a similar manner, additional WHERE cards 126, WHAT cards 134, WHY cards 130, WHEN cards 132, and HOW cards 136 are used. In this regard, one or more complete sentences for where ideas are recorded on the WHERE cards 126, completed what thoughts are recorded on the WHAT cards 134, completed why ideas are recorded on the WHY cards 130, completed when thoughts are recorded on the WHEN cards 132, and completed how responses are recorded on the HOW cards 136. Blank cards 138 are provided for recording such completed sentences where required.

In using the cards 112, one group of cards containing each of the key words WHERE, WHO, WHY, WHEN, WHAT, and HOW are used for each idea that is to be incorporated into the story. In this regard, one or more cards 112 having a particular key word 120 thereon may be used for recording each idea of the story. Once all cards 112 have been completed, the cards from a related idea are arranged in sequence. Once the cards 112 are arranged in sequence and in accordance with the various ideas of the story, such cards may be sewn together using the needle 114 and thread 116 in a manner shown in FIG. 3. The outline of the story may be read and the ideas may be rearranged where necessary by simply sewing the cards into such new arrangement. In an alternative embodiment (not shown) the holes 124 may be provided with a slit to allow for the easy removal of each card 112 without the removal of an adjacent card while retaining such card on the thread 116. If desired, once the cards 112 have been arranged into their final sequence, the fasteners 118 may be used to secure such cards together in a more permanent relationship.

As thus far described, the teaching apparatus and method in accordance with the present invention has resulted in the developing of an outline for the preparation of a writing therefrom on a selected topic. In this regard, the teaching apparatus 100 has stimulated the creation of thoughts or concepts to be recorded in the form of one word or short phrase for each of the cards 112 provided with a different key word 120. In addition, the created thoughts have been expanded into one or more completed sentences for each such created thought provided on each of the cards 112. In accordance with one example of the present invention, a plurality of cards 112 in the form of an outline for a story entitled "Surprise Party" is provided hereat as follows:

| | |
|---|---|
| WHO CARD 140 | |
| My brother Todd | |
| WHY CARD 142 | |
| Todd, 14 | |
| WHAT CARD 144 | |
| Surprise party | |
| WHO CARD 166 | WHY CARD 146 |
| Even though my brother Todd didn't know it, I was planning a surprise party for him. | Todd - never had a surprise party. |
| WHEN CARD 168 | WHO CARD 148 |
| August 4th | Me |
| WHEN CARD 170 | WHY CARD 150 |
| The party would be held on August 4th. | Close relationship |
| WHERE CARD 172 | WHY CARD 152 |
| Our house | Todd was two years older than I, and although I am attending elementary school and he is a freshman in high school, we are very close and have a marvelous relationship. |
| WHO CARD 174 | HOW CARD 154 |
| Mom and Dad | Keep secret |
| HOW CARD 176 | HOW CARD 156 |

| | -continued |
|---|---|
| Share cost | I didn't say a word about his birthday. I knew if we talked, I would begin to smirk, smile, or laugh and then he would know that something was happening. |
| WHAT CARD 178 | HOW CARD 158 |
| Invitations, refreshments, decorations | Mail "Surprise" invitations to friends. |
| WHY CARD 180 | WHY CARD 160 |
| I asked Mom and Dad to share the cost of the refreshments, invitations and decorations. | I mailed the invitations to his friends. |
| WHO CARD 182 | WHAT CARD 162 |
| Todd's friends | Teenage telephone |
| WHO CARD 184 | WHAT CARD 164 |
| Ian | I requested that they respond by calling me on my teenage phone, which is unlisted and a separate number. |
| HOW CARD 186 | |
| Ian - invite Todd day of his birthday | |
| WHO CARD 188 | |
| I asked him to invite him to dinner and a Yankee game the day of his birthday. | |
| WHAT CARD 190 | |
| Yankees - game | |
| WHAT CARD 192 | |
| We presented him with tickets for Sunday for the five of us. | |

The outline as thus far illustrated, is used by the individual in writing the completed story as follows:

"Even though my brother Todd didn't know it, I was planning a surprise party for him. The party would be held on August 4th, his birthday.

Todd was two years older than I; and although I am attending elementary school and he is a freshman in high school, we are very close and have a marvelous relationship.

So that he wouldn't guess what I was doing, when he returned from camp at the end of July, I didn't say a word about his birthday. I knew if we talked, I would begin to smirk, smile, or laugh and then he would know that something was happening.

I asked Mom and Dad to share the cost of the refreshments, invitations, and decorations. They unhesitatingly agreed, but asked that they be included on the guest list. Needless to say, I knew that they would be thrilled and probably even pay for the entire party; after all, I only get an allowance of $2.50 per week.

I immediately went to the stationery store with Mom and purchased invitations that had "Surprise Party" on them. I mailed the invitations to his friends, fifteen in all. I requested that they respond by calling me on my teenage phone, which is unlisted and a separate number.

I couldn't imagine how Todd's friends would keep this secret, but they did! If anyone gave a hint to my brother, the whole surprise would be ruined.

After the invitations were mailed, I became very excited, but somewhat nervous. I had asked his friend Ian to invite him to dinner and a Yankee game on his birthday and Mom and Dad agreed. They told Todd that our family would celebrate his birthday the following day, Sunday.

Ian and I decided that he and Todd would stop at the house before they left for the game to pick up a heavier jacket and some refreshments.

As soon as Todd left for Ian's, Mom, Dad, and I became super machines and hurriedly decorated the house and prepared the refreshments. Todd's friends began to arrive and pitched in. They were as excited as we!

By six o'clock, we were ready! When my brother entered the house for his jacket, we all jumped out and shouted, "Surprise!".

My brother was completely shocked and totally surprised. As to the Yankee game, we presented him with tickets for Sunday for the five of use. Of course, we included Ian who helped keep this a surprise.

Todd said the party was the best birthday present he ever received."

Once the story has been completed, a checklist may be utilized. In this regard, the number of sentences and paragraphs of the story is recorded on a blank form and each sentence in each paragraph is systematically checked as to form and content. Specifically, as to form, each sentence and paragraph is checked as to capitalization, punctuation, spelling, sentence sense, handwriting, grammar, and margin, heading, and indentations. As to content, each sentence and paragraph is checked as to meeting the assignment, being sufficient, being appropriately titled, and being of interesting vocabulary. The checklist may be provided as a form having the appropriate spaces for inserting a checkmark when each of the itemized categories for each sentence and paragraph have been reviewed.

There has thus been described a teaching method and apparatus 100 adapted for developing an outline for the preparation of a writing therefrom on a selected topic. The teaching apparatus 100 has been described as being constructed from a plurality of key words adapted for stimulating in an individual the creation of a plurality of thoughts related to the key word and the topic. A plurality of cards are provided having one of the key words thereon and having a portion thereof adapted for recording the created thoughts. A needle and string is provided for sewing the plurality of cards having the recorded thoughts thereon into an outline for the preparation of a writing therefrom on the selected topic without procrastination.

In accordance with a modified embodiment of the present invention, such embodiment is adapted for preparing a writing on a lecture, discussion, or chapter read from a book. In this regard, once an individual has heard or read an important idea or fact, such idea or fact is recorded on one of the WHERE cards 126, WHO cards 128, WHY cards 130, WHEN cards 132, WHAT cards 134, and/or HOW cards 136 as appropriate. In the event there are specific expanded details which should be included for each of the cards 112, such details are written on the appropriately color coded cards as noted above. The cards 112 are arranged in a logical order, in addition to connecting all previous notes taken to some other notes taken in a sensible, logical way. Complete sentences are written for each idea or fact recorded and the cards 112 are sewn together in accordance with the ideas as logically arranged. The completed outline is proofread, rearranged, reread and finally copied into its final form.

Although the invention herein has been described with reference to particular embodiments, it is to be understood that these embodiments are merely illustrative of the principles and application of the present invention. It is to be understood that numerous modifications may be made in the illustrative embodiments and that other arrangements may be devised without departing from the spirit and scope of the present invention as defined by the appended claims.

What is claimed is:

1. A teaching apparatus for developing an outline for the preparationn of a writing therefrom on a selected topic, said teaching apparatuus comprising means for stimulating in an individual the creation of a plurality of thoughts related to said topic, said stimulating means comprising a plurality of cards having a key word thereon for stimulating the creation of said thoughts related to said topic and said key word, said key word selected from the words comprising where, who, why, when, what and how, means for recording said created thoughts, and means for arranging said recorded thoughts into an outline for the development of a writing therefrom.

2. The teaching apparatus as set forth in claim 1 wherein said cards having said key words thereon are color-coded.

3. The teaching apparatus as set forth in claim 1 wherein said recording means includes a portion of said cards having said key words thereon.

4. The teaching apparatus as set forth in claim 1 wherein said arranging means includes a needle and string.

5. A teaching apparatus for developing an outline for the preparation of a writing therefrom on a selected topic, said teaching apparatus comprising a plurality of recorded key words for stimulating in an individual the creation of a plurality of thoughts related to said recorded key word and said selected topic, said key words selected from the words comprising where, who, why, when, what and how, a plurality of cards having a portion thereof for recording said created thoughts thereon, and means for removably arranging said plurality of cards having said recorded thoughts thereon into an outline for the preparation of a writing therefrom on said selected topic.

6. The teaching apparatus as set forth in claim 5 wherein said cards include one of said key words provided thereon.

7. The teaching apparatus as set forth in claim 5 wherein each of said cards having a different key word thereon is of a different color.

8. The teaching apparatus as set forth in claim 5 wherein said arranging means includes a needle and string for removably sewing said cards together into said outline.

9. A teaching apparatus for developing an outline for the preparation of a writing therefrom on a selected topic, said teaching apparatus comprising a plurality of recorded key words adapted for stimulating in an individual the creation of a plurality of thoughts related to said recorded key word and said topic, said key words selected from the words comprising where, who, why, when, what and how, a plurality of cards having thereon one of said recorded key words and having a portion thereof for recording said created thoughts thereon, and a needle and string for sewing said plurality of cards having said recorded thoughts thereon into an outline for the preparation of a writing therefrom on said selected topic.

10. The teaching apparatus as set forth in claim 9 further including a clip for permanently securing said plurality of cards together into said outline.

11. The teaching apparatus as set forth in claim 9 wherein said cards are color-coded.

12. A teaching method for developing an outline for the preparation of a writing therefrom on a selected topic, said teaching method comprising the steps of providing a plurality of recorded key words for stimulating in an individual the creation of a plurality of thoughts related to said recorded key word and said selected topic, selecting said key words from the words comprising where, who, why, when, what and how, recording said plurality of created thoughts, and arranging said plurality of said recorded thoughts into an outline for the preparation of a writing therefrom on said selected topic.

13. The teaching method as set forth in claim 12 wherein said recording of said plurality of created thoughts includes providing a plurality of cards having a key word thereon and adapted for recording said created thoughts thereon.

14. The teaching apparatus as set forth in claim 12 wherein providing a plurality of said key words includes providing a plurality of cards of different colors having one of said key words thereon.

15. The teaching method as set forth in claim 12 wherein said arranging includes removably sewing said plurality of recorded thoughts together into said outline using a needle and string.

16. A teaching method for developing an outline for the preparation of a writing therefrom on a selected topic, said teaching method comprising the steps of providing a plurality of recorded key words adapted for stimulating in an individual the creation of a plurality of thoughts related to said recorded key word and said topic, selecting said key words from the words comprising where, who, why, when, what and how, recording said created thoughts on a plurality of cards having one of said recorded key words and sewing together said plurality of cards having said recorded thoughts thereon into an outline for the preparation of a writing therefrom on said selected topic.

* * * * *